(12) United States Patent
Inoue (10) Patent No.: US 11,977,501 B2
(45) Date of Patent: May 7, 2024

(54) ON-BOARD STORAGE SYSTEM FOR SHORTENING TIME REQUIRED FOR INITIALIZING STORAGE DEVICE

(71) Applicant: Panasonic Intellectual Property Management Co., Ltd., Osaka (JP)

(72) Inventor: Shinji Inoue, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 102 days.

(21) Appl. No.: 17/572,904

(22) Filed: Jan. 11, 2022

(65) Prior Publication Data
US 2022/0138129 A1 May 5, 2022

Related U.S. Application Data

(63) Continuation of application No. PCT/JP2020/025347, filed on Jun. 26, 2020.

(30) Foreign Application Priority Data

Jul. 12, 2019 (JP) .................................. 2019-129762

(51) Int. Cl.
*G06F 13/16* (2006.01)
*B60R 16/023* (2006.01)
(Continued)

(52) U.S. Cl.
CPC ...... *G06F 13/1684* (2013.01); *B60R 16/0231* (2013.01); *B60R 22/48* (2013.01);
(Continued)

(58) Field of Classification Search
CPC ...... G06F 1/189; G06F 3/0679; G06F 9/4401; G06F 12/0246; G06F 12/0646;
(Continued)

(56) References Cited

U.S. PATENT DOCUMENTS 10,377,346 B2* 8/2019 Namineni ............... H04W 4/40
2002/0144667 A1 10/2002 Ito
(Continued)

FOREIGN PATENT DOCUMENTS

| CN | 103679863 A | 3/2014 |
|---|---|---|
| JP | 2006-209744 | 8/2006 |
| JP | 2012-066657 | 4/2012 |

OTHER PUBLICATIONS

International Search Report dated Aug. 18, 2020 in International (PCT) Application No. PCT/JP2020/025347 with English translation.
(Continued)

*Primary Examiner* — Thomas J. Cleary
(74) *Attorney, Agent, or Firm* — Wenderoth, Lind & Ponack, L.L.P.

(57) ABSTRACT

The present disclosure provides an on-board storage system in which the time required for initializing a storage device is substantially shortened by devising a backend start timing. The on-board storage system includes: a storage device that has a controller, a NAND flash memory, and an interface; an electronic control unit that electronically controls a vehicle; and a sensor. The electronic control unit communicates with the storage device through the interface, the sensor transmits a detection result of the sensor to the electronic control unit, and the electronic control unit transmits a command to start
(Continued)

initialization of the NAND flash memory to the controller when the transmitted detection result of the sensor indicates a driving-start preliminary operation.

16 Claims, 4 Drawing Sheets

(51) Int. Cl.
*B60R 22/48* (2006.01)
*B60R 25/24* (2013.01)
*B60R 25/31* (2013.01)
*B60R 25/34* (2013.01)
*G06F 3/06* (2006.01)
*G06F 12/02* (2006.01)

(52) U.S. Cl.
CPC ............ *B60R 25/245* (2013.01); *B60R 25/31* (2013.01); *B60R 25/34* (2013.01); *G06F 3/0604* (2013.01); *G06F 3/0632* (2013.01); *G06F 12/0246* (2013.01); *B60R 2022/4808* (2013.01); *G06F 2212/72* (2013.01); *G07C 2209/63* (2013.01)

(58) Field of Classification Search
CPC ............... G06F 13/1684; G06F 15/177; G06F 2211/10; G06F 2212/72; G06F 3/0604; G06F 3/0658; G06F 3/08; G06F 3/09632; G06F 13/1668; B60R 16/0231; B60R 22/48; B60R 25/245; B60R 25/31; B60R 25/34; B60R 2022/48; B60R 2022/4808; G07C 5/08; G07C 9/00309; G07C 2009/00547; G07C 2209/63

See application file for complete search history.

(56) References Cited

U.S. PATENT DOCUMENTS

| | | | |
|---|---|---|---|
| 2006/0200276 A1* | 9/2006 | Sayama | H02J 9/061 701/1 |
| 2006/0282550 A1 | 12/2006 | Fujimoto | |
| 2010/0005227 A1* | 1/2010 | Nakanishi | G11C 16/20 711/E12.001 |
| 2013/0054945 A1* | 2/2013 | Free | G06F 1/3209 713/1 |
| 2013/0091323 A1* | 4/2013 | Kanamori | G06F 11/1417 711/E12.008 |
| 2014/0114539 A1* | 4/2014 | Ando | F02D 35/00 701/51 |
| 2014/0195792 A1* | 7/2014 | Chew | G06F 9/4401 713/2 |
| 2016/0147684 A1* | 5/2016 | Sengoku | G06F 13/4282 710/105 |
| 2017/0083391 A1* | 3/2017 | Robertson | G06F 11/079 |
| 2018/0018179 A1* | 1/2018 | Scheufler | H04L 67/306 |
| 2018/0053416 A1* | 2/2018 | Sanji | G08G 1/005 |
| 2018/0270196 A1* | 9/2018 | Bathurst | H04L 12/40032 |
| 2020/0319894 A1* | 10/2020 | Golov | B60R 16/03 |

OTHER PUBLICATIONS

Extended European Search Report dated Jul. 26, 2022 in corresponding European Patent Application No. 20839969.1.
Notice of Reasons for Refusal dated Nov. 8, 2022 in corresponding Japanese Patent Application No. 2021-532762, with English machine translation.
International Preliminary Report on Patentability dated Jan. 27, 2022 in International Application No. PCT/JP2020/025347.
Office Action dated Oct. 28, 2023 in corresponding Chinese Application No. 202080050425, with Machine translation, 16 pages.

\* cited by examiner

ON-BOARD STORAGE SYSTEM FOR SHORTENING TIME REQUIRED FOR INITIALIZING STORAGE DEVICE

CROSS REFERENCE TO RELATED APPLICATION(S)

This is a continuation application of International Application No. PCT/JP2020/025347, with an international filing date of Jun. 26, 2020, which claims priority of Japanese Patent Application No. 2019-129762 filed on Jul. 12, 2019, each of the contents of which is incorporated herein by reference.

BACKGROUND

1. Technical Field

The present disclosure relates to an on-board storage system (not only by soldering, but also when it is attached via a socket, etc.) that performs data transfer between a host device and a storage device.

2. Related Art

In the field of on-board systems, currently, a large number of electronic control units (ECUs) mounted on one vehicle are being integrated. When a large number of ECUs are integrated, storage connected to individual ECUs also needs to be integrated.

An SSD or an SD card using a non-volatile memory is mainly used for storage in the field of on-board systems. A technique related to an SD card and an SD card-compatible host is disclosed in JP 2006-209744 A, for example. In ECUs, PCI Express (registered trademark: hereinafter referred to as PCIe) is currently used as a high-speed serial interface.

SUMMARY

On-board storage devices that are being integrated are required to have a large capacity and a high speed. However, in an on-board storage device, an increase in the capacity and the speed of the on-board storage device inevitably increases the time required for initializing the entire storage device.

An object of the present disclosure is to provide an on-board storage system in which the time required for initializing a storage device is substantially shortened by devising a backend start timing.

An on-board storage system of the present disclosure is an on-board storage system including: a storage device that has a controller, a NAND flash memory, and an interface; an electronic control unit that electronically controls a vehicle; and a sensor, in which: the electronic control unit communicates with the storage device through the interface; the sensor transmits a detection result of the sensor to the electronic control unit; and the electronic control unit transmits a command to start initialization of the NAND flash memory to the controller when the transmitted detection result of the sensor indicates a driving-start preliminary operation.

In the on-board storage system of the present disclosure, the backend start timing is devised, so that the time required for initializing a storage device is substantially shortened.

DETAILED DESCRIPTION OF INVENTION

Hereinafter, embodiments will be described in detail with reference to the drawings appropriately. Note however that more detailed description than necessary may be omitted. For example, detailed description of already well-known matters and duplicated description for substantially the same configuration may be omitted. This is for the purpose of preventing the following description from becoming unnecessarily redundant, to thereby facilitate the understanding of those skilled in the art.

The inventor(s) provides the accompanying drawings and the following description in order to allow those skilled in the art to fully understand the present disclosure, but do not intend to limit thereby the subject matters defined in the claims.

BACKGROUND OF PRESENT DISCLOSURE

Currently, a large number of ECUs mounted on one vehicle are being integrated. Accordingly, it is necessary to integrate the storage for which a NAND flash memory is usually used. The storage device is expected to have a capacity of terabytes in the future.

Incidentally, initialization processing of a NAND flash memory includes reading a logical/physical conversion table into a RAM and detecting a bad block after the power is turned on. When the capacity of an on-board storage device that is a NAND flash memory increases to the terabytes as described above, the time required for initialization processing increases. This delays the time when the ECU device can actually access the storage device after the power of the ECU device is turned on (e.g., engine being started by driver of automobile). This delay may have a fatal influence on processing of an important application in the ECU device.

Figure 4:
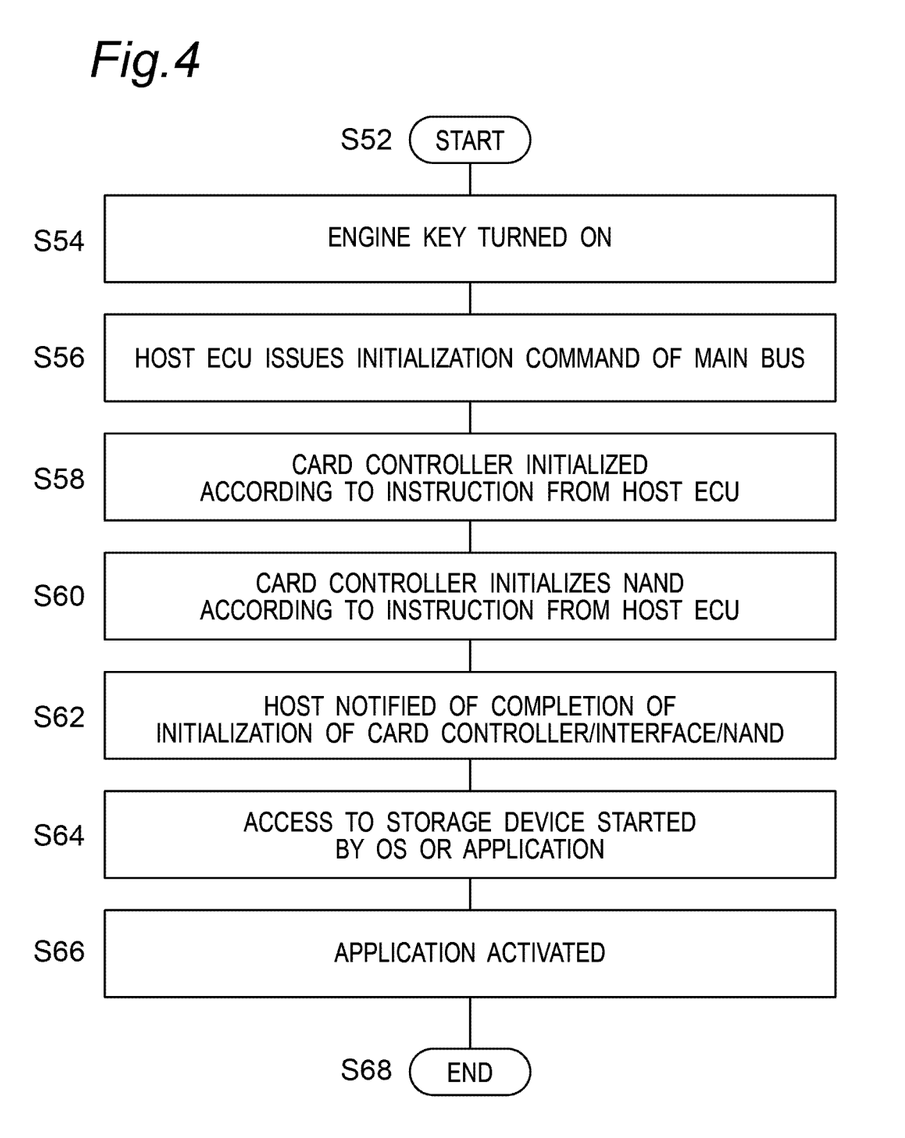
FIG. 4 is a flowchart illustrating an operation example of the startup of a NAND flash memory in a conventional on-board storage system.

FIG. 4 is a flowchart illustrating an operation example of the startup of a NAND flash memory in a conventional on-board storage system. As illustrated in FIG. 4, after the start of a startup operation (step 52), when an engine key is turned on (step S54), a host on-board ECU issues an initialization command of a main bus configured with a PCIe bus (step S56). Subsequently, a controller of the storage device is initialized according to an instruction from the host on-board ECU (step S58), and the controller of the storage device initializes the NAND flash memory according to an instruction from the host on-board ECU (step S60). Furthermore, the host on-board ECU is notified of completion of initialization of the controller of the storage device, a main bus interface, and the NAND flash memory (step S62). In response to this, access to the storage device by an OS or an application is started (step S64), the application is activated (step S66), and the startup operation of the NAND flash memory ends (step S68).

As described above, even after the start of the engine, access to the storage device is not possible until after the end of the time-consuming initialization processing (see step S60) of the NAND flash memory.

The inventor has developed an on-board storage system according to the present disclosure that solves the above-described problem. The on-board storage system according to the present disclosure advances the start timing of initialization of a NAND flash memory in the backend.

Hence, in the on-board storage system of the present disclosure, even if the capacity of the NAND flash memory increases in units of terabytes, the increase in the initialization processing does not adversely affect the processing of important applications of the ECU device.

Embodiment 1

Hereinafter, an on-board storage system according to embodiment 1 of the present disclosure will be described with reference to the drawings.

[1.1. Configuration of On-Board Storage System]

Figure 1A:
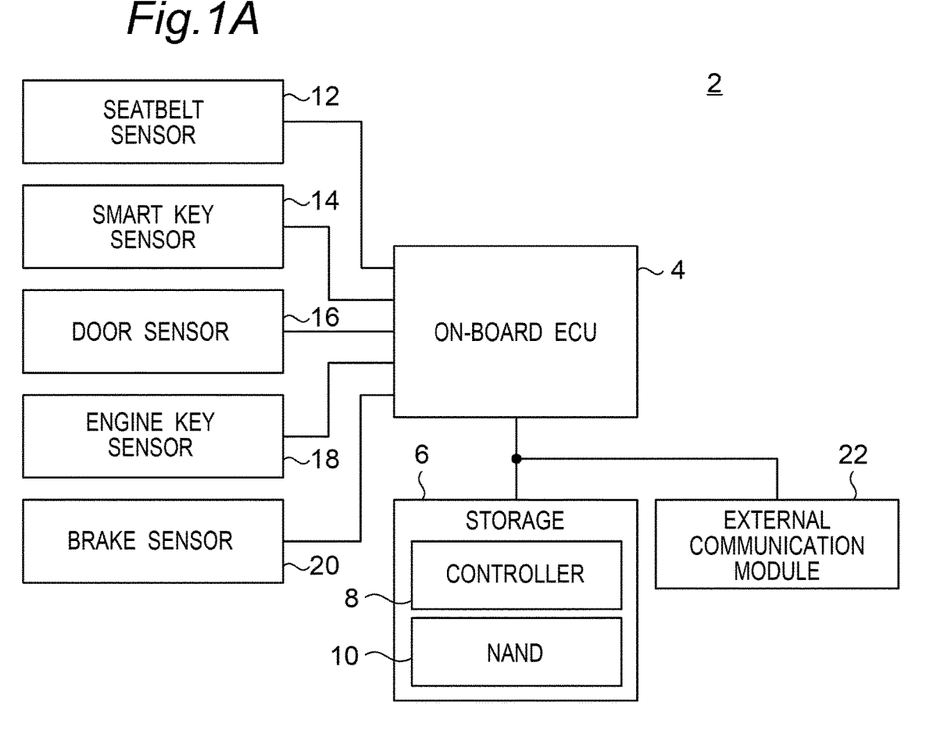
FIG. 1A is a block diagram of an on-board storage system according to embodiment 1.
Figure 1B:
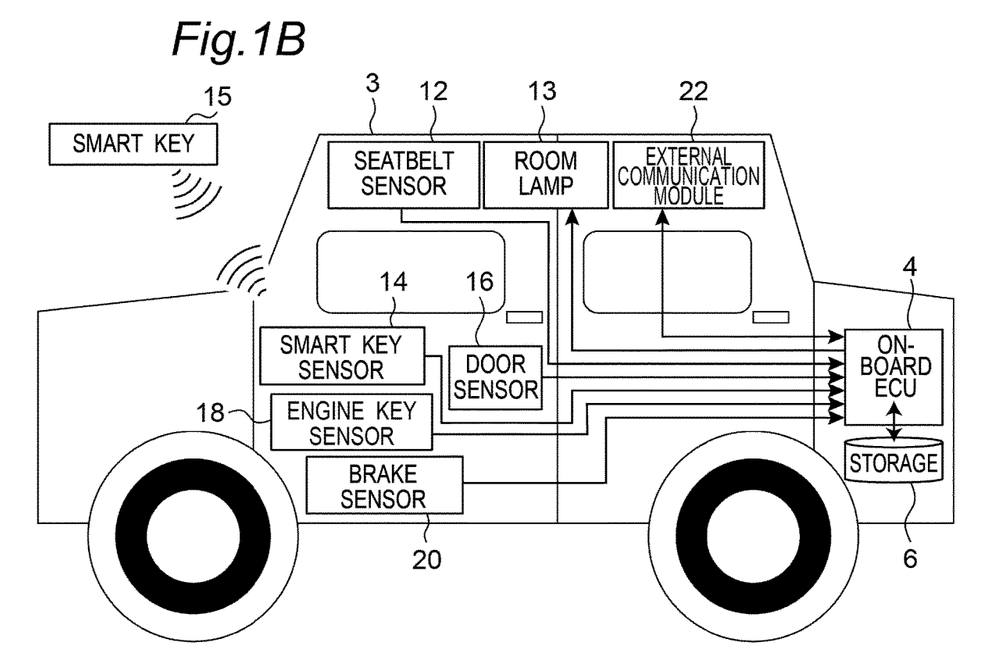
FIG. 1B is a block diagram of the on-board storage system according to embodiment 1 mounted on a vehicle.

FIG. 1A is a block diagram of an on-board storage system 2 according to embodiment 1. FIG. 1B is a block diagram of the on-board storage system 2 according to embodiment 1 mounted on a vehicle 3.

The on-board storage system 2 according to the present embodiment illustrated in FIG. 1A includes an on-board ECU 4 and a storage device 6. The storage device 6 includes a controller 8 and a NAND flash memory 10 which is a non-volatile memory. The controller 8 in the storage device 6 performs control related to input, output, and storage of data to the NAND flash memory 10. The on-board ECU 4 and the storage device 6 are connected to an external communication module 22 conforming to WiFi (registered trademark) or the like, and the on-board storage system 2 can perform data communication with, for example, an external cloud storage through the external communication module 22.

Furthermore, the on-board storage system 2 includes a sensor group including a seatbelt sensor 12, a smart key sensor 14, a door sensor 16, an engine key sensor 18, and a brake sensor 20 as peripheral devices, and the on-board ECU 4 is connected to these peripheral devices. A detection result of the sensor group is transmitted to the on-board ECU 4.

The seatbelt sensor 12 is a sensor that detects whether the driver wears a seatbelt or not, and is, for example, a sensor that is turned on when the driver wears the seatbelt.

The smart key sensor 14 is a sensor included in a smart key system, and is a sensor that detects that a driver holding a smart key 15 has approached within a predetermined distance. The smart key sensor 14 may be able to detect whether the smart key 15 is present inside or outside the vehicle 3. As illustrated in FIG. 1B, the on-board ECU 4 is also connected to a room lamp 13 in the vehicle 3. The predetermined distance, at which the smart key sensor 14 detects the proximity of the driver, that is, the smart key 15, may be the same as the distance at which the room lamp 13 is turned on due to the proximity of the smart key 15 (i.e., driver). The predetermined distance, at which the smart key sensor 14 detects the proximity of the driver, that is, the smart key 15, may be a distance at which the doors of the vehicle 3 are automatically unlocked when the smart key 15 approaches.

The door sensor 16 is a sensor that detects opening and closing of doors. The door sensor 16 can also detect locking and unlocking of the doors. The door sensor 16 may be provided for each of the doors of the vehicle 3.

The engine key sensor 18 is a sensor that detects a state of an engine key, such as a state in which the key has turned on an accessory power supply in a key cylinder, a state in which the key has turned on an ignition power supply in the key cylinder, or the like.

The brake sensor 20 is a sensor that detects that a brake pedal is pressed by the driver.

The seatbelt sensor 12, the smart key sensor 14, the door sensor 16, the engine key sensor 18, and the brake sensor 20 are a sensor group for detecting and identifying a "driving-start preliminary operation" to be described later.

Figure 2:
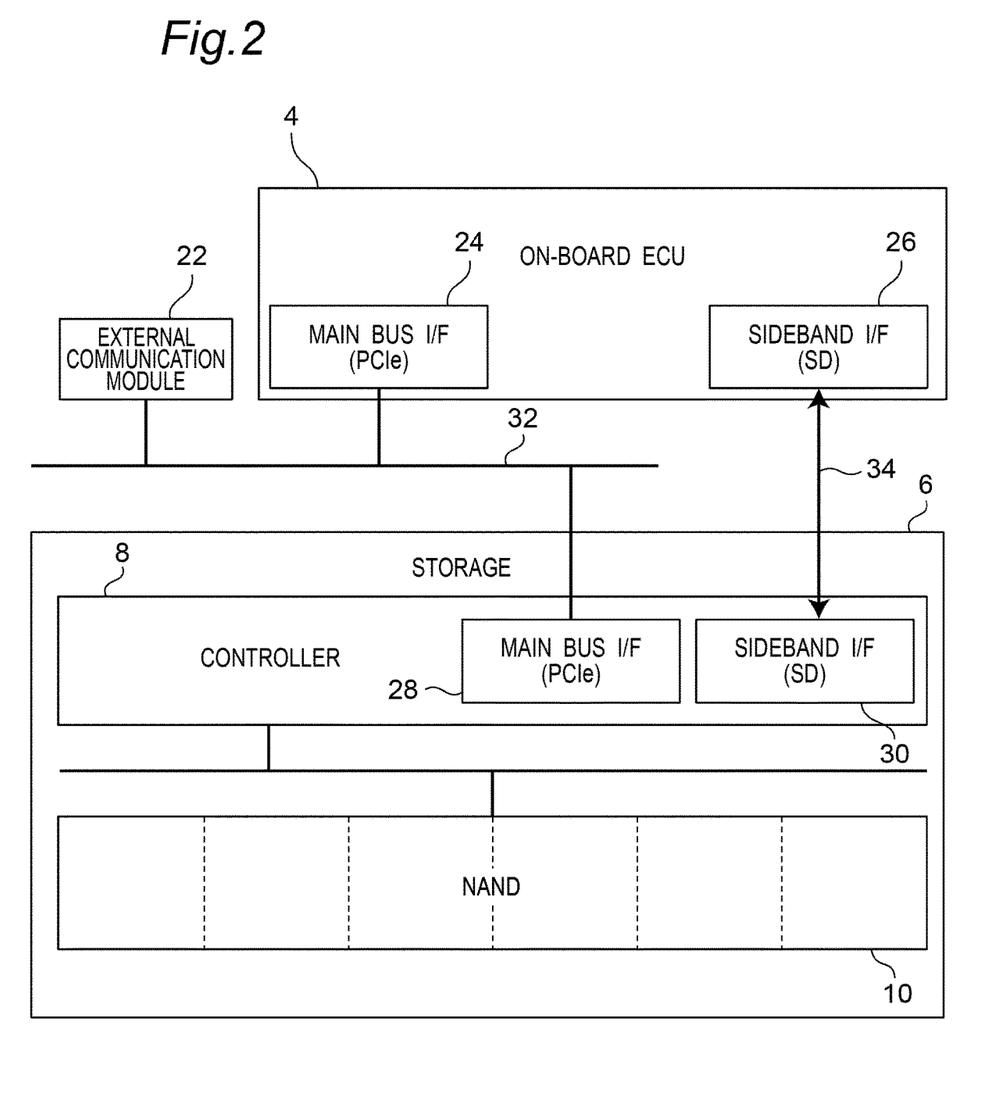
FIG. 2 is a block diagram mainly illustrating an on-board ECU, a storage device, and a communication bus (Main bus (PCIe bus) and sideband bus (SD bus)) of the on-board storage system according to embodiment 1.

FIG. 2 is a block diagram mainly illustrating the on-board ECU 4, the storage device 6, and a communication bus (main bus (PCIe bus) 32 and sideband bus (SD bus) 16) of the on-board storage system 2 according to embodiment 1.

As illustrated in FIG. 2, the controller 8 of the storage device 6 includes a main bus interface 28 and a sideband interface 30. The on-board ECU 4 also includes a main bus interface 24 and a sideband interface 26.

The on-board storage system 2 uses PCIe as a high-speed serial interface, and the main bus interface 24 of the on-board ECU 4 and the main bus interface 28 of the storage device 6 are connected to the main bus (PCIe bus) 32. The main bus (PCIe bus) 32 is also connected to the external communication module 22. Note that the main bus is not limited to the PCIe bus. The connection among the main bus interface 24, the external communication module 22, and the main bus interface 28 may be a network connection using Ethernet (registered trademark) or the like.

Furthermore, the sideband interface 26 of the on-board ECU 4 and the sideband interface 30 of the storage device 6 are connected through a sideband bus (SD bus) 34 to perform data communication.

The NAND flash memory 10 in the storage device 6 is divided into a plurality of logical partitions. The NAND flash memory 10 does not necessarily have to be divided. The NAND flash memory 10 is controlled by the controller 8 with respect to input, output, and storage of data.

[1.2. Operation of On-Board Storage System]

Figure 3:
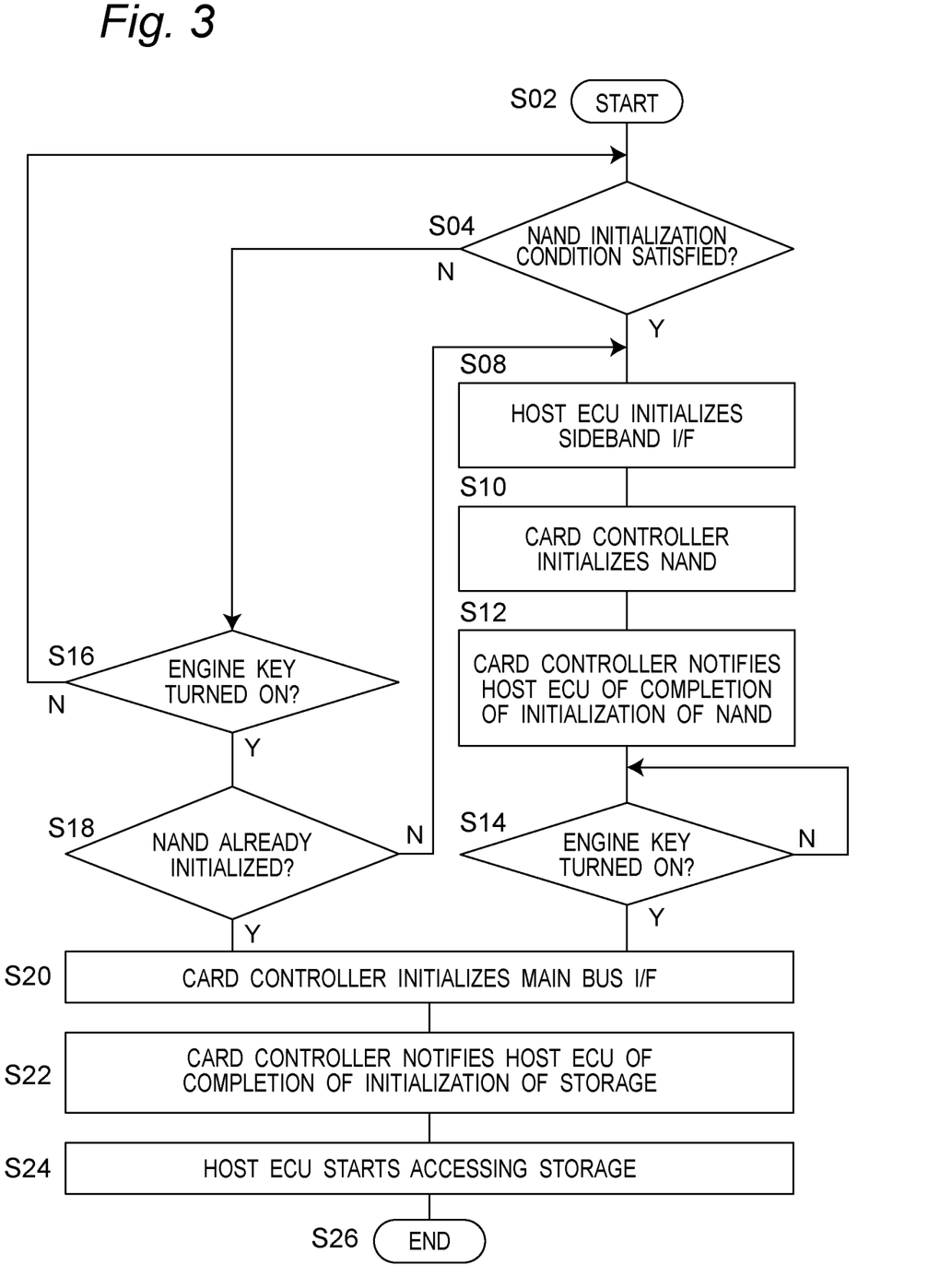
FIG. 3 is a flowchart illustrating an operation of high-speed startup of a NAND flash memory in the on-board storage system according to embodiment 1.

FIG. 3 is a flowchart illustrating an operation of high-speed startup of the NAND flash memory in the on-board storage system 2 according to the present embodiment. An operation of high-speed startup of the NAND flash memory will be described with reference to FIG. 3. Note that as a precondition of the operation illustrated in FIG. 3, power supply of the host on-board ECU 4 is always on.

High-speed startup processing illustrated in FIG. 3 is started when the NAND flash memory 10 is powered off (step S02). The power-off of the NAND flash memory 10 will be described later. After the start of the high-speed startup processing, at first, the on-board ECU 4 continues to check whether the initialization condition of the NAND flash memory 10 is satisfied (step S04) and whether the engine key is ON (step S16) in a first standby state (i.e., step S04: No and step S16: No are continued).

When the initialization condition of the NAND flash memory 10 is satisfied during the first standby state (step S04: Yes), the initialization processing of the NAND flash memory 10 (steps S08 to S12) is immediately started.

Here, satisfying the initialization condition of the NAND flash memory 10 means that a detection result of the sensor group transmitted to the on-board ECU 4 indicates a driving-start preliminary operation. As described above, the sensor group includes the seatbelt sensor 12, the smart key sensor 14, the door sensor 16, the engine key sensor 18, and the brake sensor 20. The driving-start preliminary operation will be described later.

The initialization processing (steps S08 to S12) of the NAND flash memory 10 is as follows. First, the host on-board ECU 4 initializes the sideband interface (26, 30) and the sideband bus 34 (step S08). Next, the host on-board ECU 4 transmits a command to start initialization of the NAND flash memory 10 to the controller 8 of the storage device 6, and in response to this, the controller 8 of the storage device 6 initializes the NAND flash memory 10 (step S10). Next, the controller 8 of the storage device 6 notifies the host on-board ECU 4 of completion of the initialization of the NAND flash memory 10 through the sideband bus 34 (step S12).

Thereafter, the on-board ECU 4 continues to confirm whether the engine key is turned on (step S14) in a second standby state (i.e., step S14: No is continued). When the engine key is turned on (step S14: Yes), the processing proceeds to step S20.

Note that when it is detected that the engine key is ON in the above-described first standby state (step S16: Yes), it is confirmed whether initialization of the NAND flash memory 10 has already been completed (step S18). If the initialization of the NAND flash memory 10 has not been completed (step S18: No), the processing proceeds to the beginning of step S08, and the initialization processing of the NAND flash memory 10 (steps S08 to S12) is performed. If initialization of the NAND flash memory 10 has already been completed (step S18: Yes), the processing proceeds to step S20.

In step S20, the controller 8 of the storage device 6 initializes the main bus interface (28, 24) and the main bus (PCIe bus) 32.

Subsequently, the controller 8 of the storage device 6 notifies the host on-board ECU 4 of completion of the initialization of the storage device 6 through the main bus (PCIe bus) 32 or the sideband bus 34 (step S22). In response to this, the host on-board ECU 4 starts accessing the storage device 6 (step S24). The high-speed startup processing of the NAND flash memory ends (step S26).

When step 4 is Yes in the flowchart illustrating the high-speed startup operation of the NAND flash memory in the on-board storage system 2 according to the present embodiment illustrated in FIG. 3, the initialization of the NAND flash memory 10 is completed immediately before step S20, that is, immediately before the step in which the controller 8 of the storage device 6 initializes the main bus interface (28, 24) and the main bus (PCIe bus) 32. Accordingly, although not illustrated in FIG. 3, the on-board ECU 4 can actually access the storage device 6 at an early timing immediately after the start of the engine immediately before step S20.

[1.2.1. Driving-Start Preliminary Operation]

It will be described that a detection result of the sensor group indicates a driving-start preliminary operation. As described above, the on-board storage system according to the present embodiment advances the start timing of initialization of the NAND flash memory in the backend. An indicator of the timing to be advanced is detection of a driving-start preliminary operation by the sensor group. The driving-start preliminary operation detected by the sensor group includes the operations [1] to [6] as follows:

[1] the smart key coming within a predetermined distance to the vehicle;
[2] unlocking of the vehicle with the smart key;
[3] the door being opened by the driver;
[4] the door being closed by the driver;
[5] the seatbelt being worn by the driver; and
[6] the brake pedal being pressed by the driver.

The driving-start preliminary operations will be described in detail.

[1.2.1.1. Smart Key Coming within Predetermined Distance to Vehicle]

When the smart key sensor 14 detects that the driver holding the smart key 15 comes within a predetermined distance, the detection may mean that the detection result of the sensor group indicates the driving-start preliminary operation. The predetermined distance at which the smart key sensor 14 detects the proximity of the smart key 15 may be the same as the distance at which the room lamp 13 is turned on due to the proximity of the smart key 15.

[1.2.1.2. Unlocking of Vehicle with Smart Key]

When the smart key sensor 14 detects that the driver holding the smart key 15 comes within a predetermined distance at which a lock of the door of the vehicle 3 is automatically released, the detection can mean that the detection result of the sensor group indicates the driving-start preliminary operation. Additionally, when the door sensor 16 for the door at a driver side detects unlocking of the door, the detection may mean that the detection result of the sensor group indicates the driving-start preliminary operation. Note that the above-described control is an example, and the present invention is not limited thereto. For example, a sensor that detects unlocking of a door of the vehicle 3 by remote control, operation on a key hole, or the like by a driver carrying a key not limited to a smart key may be arranged instead of the smart key sensor 14, and when the sensor detects the unlocking, the detection may can mean that the detection result of the sensor group indicates the driving-start preliminary operation. Alternatively, when the smart key sensor 14 detects that the driver holding the smart key 15 operates an external knob of the door of the vehicle 3 to unlock the door of the vehicle 3, the detection may mean that the detection result of the sensor group indicates the driving-start preliminary operation.

[1.2.1.3. Door Being Opened by Driver]

When the door sensor 16 for the door at the driver side detects opening of the door, the detection may can mean that the detection result of the sensor group indicates the driving-start preliminary operation. Note that since the opening of the door at this time is an operation for the driver to get on the vehicle 3, "the door being opened by the driver" as the driving-start preliminary operation may be combined with other conditions and operations to be a more reliable driving-start preliminary operation. For example, "opened by the external knob of the door" may be combined. Alternatively, "a predetermined time elapses after the smart key sensor 14 detects that the smart key 15 is temporarily separated by a predetermined distance or more" may be combined. Here, "the smart key 15 is temporarily separated by the predetermined distance or more" may be connected to "power-off of the NAND flash memory in the backend" as described later. Furthermore, "The smart key sensor 14 detects that the driver holding the smart key 15 comes within a predetermined distance" may be combined. Furthermore, "the smart key sensor 14 detects that the smart key 15 is present outside the vehicle 3" may be combined.

[1.2.1.4. Door Being Closed by Driver]

When the door sensor 16 for the door at the driver side detects closing of the door, the detection may mean that the detection result of the sensor group indicates the driving-start preliminary operation. Note that since the closing of the door at this time is an operation for the driver to get on the vehicle 3, "the door being closed by the driver" as the driving-start preliminary operation may be combined with other conditions and operations to be a more reliable driving-start preliminary operation. For example, "closed by an internal knob of the door" may be combined. Alternatively, "a predetermined time elapses after the smart key sensor 14 detects that the smart key 15 is temporarily separated by a predetermined distance or more" may be combined. Here, "the smart key 15 is temporarily separated by the predetermined distance or more" may be connected to "power-off of the NAND flash memory in the backend" as described later. Furthermore, "the smart key sensor 14 detects that the smart key 15 is present inside the vehicle 3" may be combined.

[1.2.1.5. Seatbelt Being Worn by Driver]

When the seatbelt sensor 12 detects wearing of the seatbelt by the driver, the detection may mean that the detection result of the sensor group indicates the driving-start preliminary operation.

[1.2.1.6. Brake Pedal Being Pressed by Driver]

When the brake sensor 20 detects that the brake pedal is pressed by the driver, the detection may mean that the detection result of the sensor group indicates the driving-start preliminary operation. Note that since the pressing of the brake pedal here is an operation for the driver to start the engine, "the pressing of the brake pedal by the driver" as the driving-start preliminary operation may be combined with other conditions and operations to be a more reliable driving-start preliminary operation. For example, "a state in which the engine is not running" may be combined.

[1.2.2. Power-Off of NAND Flash Memory in Backend]

Power-off of the NAND flash memory 10 in the backend according to the present embodiment will be described.

The on-board storage system 2 according to the present embodiment initializes the NAND flash memory 10 in the backend through the sideband interface (26, 30) separately from commands given through the main bus interface (24, 28). Accordingly, in the on-board storage system 2 according to the present embodiment, the timing of powering off the NAND flash memory 10 in the backend may also be separately determined.

Even if the driver turns off the engine (i.e., even when the engine key is turned off), the storage device 6 may be accessed because access can be required by, for example, an on-board accessory or an on-board security system. Hence, in the on-board storage system 2 according to the present embodiment, basically, the power of the NAND flash memory 10 in the backend is turned off at the timing when the smart key 15 is temporarily separated from the vehicle 3 by a predetermined distance or more.

While the smart key sensor 14 detects that the smart key 15 is present in the vehicle, the storage device 6 may be controlled so as not to turn off the power of the NAND flash memory 10 in the backend.

Note that if there is no power consumption when there is no access to the backend, the power may not be turned off after the power is once turned on and the NAND flash memory 10 is initialized. In this case, the power is turned on next when, for example, after all the power is turned off as the on-board system due to battery replacement or the like, any one of the "driving-start preliminary operations" including [1] to [6] described above is indicated again, and the NAND flash memory 10 is initialized.

[1.3. Summary]

The on-board storage system 2 according to the present embodiment is the on-board storage system 2 on which the storage device 6 including the controller 8, the NAND flash memory 10, and the interface (28, 30), the on-board ECU 4, and the sensor group including a plurality of sensors are mounted. The on-board ECU 4 communicates with the storage device 6 through the interface (28, 30). The sensor group transmits its detection result to the on-board ECU 4. When the transmitted detection result of the sensor group indicates the driving-start preliminary operation, the on-board ECU 4 transmits a command to start initialization of the NAND flash memory 10 to the controller 8.

With this configuration, the on-board storage system according to the present embodiment can substantially shorten the time required for initializing the storage device.

Furthermore, in the on-board storage system according to the present embodiment, the on-board ECU 4 includes the main bus interface 24 and the sideband interface 26. The interface of the storage device 6 includes the main bus interface 28 and the sideband interface 30. The main bus interface 24 of the on-board ECU 4 and the main bus interface 28 of the storage device 6 are connected through the main bus (PCIe bus) 32. The sideband interface 26 of the on-board ECU 4 and the sideband interface 30 of the storage device 6 are connected through the sideband bus 34. When the on-board ECU 4 transmits a command for starting initialization of the NAND flash memory 10 to the controller 8, the on-board ECU 4 initializes the sideband interface 26 of the on-board ECU 4, the sideband bus 34, and the sideband interface 30 of the storage device 6.

With this configuration, unnecessary power-on of devices and equipment dependent on the main bus 32 is curbed, and as a result, power consumption is reduced.

Furthermore, in the on-board storage system according to the present embodiment, the sensor group includes the smart key sensor 14, and the detection result of the smart key sensor 14 is the detection result of the sensor group indicating the driving-start preliminary operation.

With this configuration, the on-board storage system according to the present embodiment can substantially shorten the time required for initializing the storage device.

Furthermore, in the on-board storage system according to the present embodiment, the sensor group includes the smart key sensor 14, and when the smart key sensor 14 detects that the smart key 15 comes within a predetermined distance, the detection means that the detection result of the sensor group indicates the driving-start preliminary operation.

With this configuration, the on-board storage system according to the present embodiment can substantially shorten the time required for initializing the storage device.

Furthermore, in the on-board storage system according to the present embodiment, the sensor group includes the door sensor 16, and when the door sensor 16 detects unlocking of the door, the detection means that the detection result of the sensor group indicates the driving-start preliminary operation.

With this configuration, the on-board storage system according to the present embodiment can substantially shorten the time required for initializing the storage device.

Furthermore, in the on-board storage system according to the present embodiment, the sensor group includes the door sensor 16 and the smart key sensor 14, and when the door sensor 16 detects opening of the door and the smart key sensor 14 detects that the smart key 15 is present outside the vehicle 3, the detection means that the detection result of the sensor group indicates the driving-start preliminary operation.

With this configuration, the on-board storage system according to the present embodiment can substantially shorten the time required for initializing the storage device.

Furthermore, in the on-board storage system according to the present embodiment, the sensor group includes the door sensor 16 and the smart key sensor 14, and when the door sensor 16 detects closing of the door and the smart key sensor 14 detects the presence of the smart key 15 inside the vehicle 3, the detection means that the detection result of the sensor group indicates the driving-start preliminary operation.

With this configuration, the on-board storage system according to the present embodiment can substantially shorten the time required for initializing the storage device.

Furthermore, in the on-board storage system according to the present embodiment, the sensor group includes the seatbelt sensor 12, and when the seatbelt sensor 12 detects wearing of the seatbelt, the detection means that the detection result of the sensor group indicates a driving-start preliminary operation.

With this configuration, the on-board storage system according to the present embodiment can substantially shorten the time required for initializing the storage device.

Furthermore, in the on-board storage system according to the present embodiment, the sensor group includes the brake sensor 20, and when the brake sensor 20 detects that the brake pedal is pressed in a state where the engine is not running, the detection means that the detection result of the sensor group indicates the driving-start preliminary operation.

With this configuration, the on-board storage system according to the present embodiment can substantially shorten the time required for initializing the storage device.

Other Embodiments

As described above, embodiment 1 has been described as an example of the technique disclosed in the present application. However, the technique in the present disclosure is not limited thereto, and can also be applied to exemplary embodiments in which changes, replacements, additions, omissions, and the like are made as appropriate.

The accompanying drawings and the detailed description have been provided in order to describe the embodiment. Accordingly, the components described in the accompanying drawings and the detailed description may include not only components essential for solving the problem but also components that are not essential for solving the problem in order to illustrate the above technique. Hence, it should not be immediately recognized that these non-essential components are essential based on the fact that these non-essential components are described in the accompanying drawings and the detailed description.

Since the above-described embodiment is intended to illustrate the technique of the present disclosure, various changes, replacements, additions, omissions, and the like can be made within the scope of the claims or equivalents thereof.

The technique of the present disclosure can be applied not only to a gasoline vehicle or a hybrid vehicle equipped with an engine but also to an electric vehicle. In the case of application to an electric vehicle, "turning on the engine" of a gasoline vehicle may be replaced with "turning on the motor and immediately transmitting the power to the outside".

In a case where a device that can identify a user (i.e., driver) such as a fingerprint authentication device is provided in the on-board storage system 2 of the present disclosure, when the controller 8 of the storage device 6 initializes the NAND flash memory 10 (FIG. 3, step S10), user restriction may be set in the area to be initialized. That is, the on-board storage system 2 may be configured such that the area to be initialized and used is changed for each driver. When the on-board storage system 2 is configured in this manner, initialization of the NAND flash memory can be performed at a higher speed.

The present invention can be used in an on-board storage system including a NAND flash memory.

What is claimed is:
1. An on-board storage system comprising:
a storage device that has a controller, a NAND flash memory, and an interface;
an electronic control unit that electronically controls a vehicle; and
a sensor,
wherein the electronic control unit communicates with the storage device through the interface,
wherein the sensor transmits a detection result of the sensor to the electronic control unit,
wherein the electronic control unit has a first interface for a main bus and a second interface for a sideband bus,
wherein the interface of the storage device includes a third interface for the main bus and a fourth interface for the sideband bus,
wherein the first interface for the main bus of the electronic control unit and the third interface for the main bus of the storage device are connected through the main bus;
wherein the second interface for the sideband bus of the electronic control unit and the fourth interface for the sideband bus of the storage device are connected through the sideband bus,
wherein the sideband bus is configured to communicate data bidireectionally between the electronic control unit and the storage device,
wherein, when a transmitted detection result of the sensor indicates a driving-start preliminary operation, the electronic control unit initializes the second interface for the sideband bus of the electronic control unit, the sideband bus, and the fourth interface for the sideband bus of the storage device, and the electronic control unit transmits a command to start initialization of the NAND flash memory to the controller through the initialized sideband bus,
wherein the sideband bus is initialized separately from the main bus by the electronic control unit,
wherein the main bus is a PCIe bus and the sideband bus is an SD bus, and
wherein, the NAND flash memory is initialized through the SD bus.
2. The on-board storage system as claimed in claim 1,
wherein the sensor is a smart key sensor, and
wherein the detection result of the sensor indicating the driving-start preliminary operation is a detection result of the smart key sensor.
3. The on-board storage system as claimed in claim 1,
wherein the sensor is a smart key sensor, and
wherein, when the smart key sensor detects that a smart key comes within a predetermined distance, the detection means that the detection result of the sensor indicates the driving-start preliminary operation.
4. The on-board storage system as claimed in claim 1,
wherein the sensor is a door sensor, and
wherein, when the door sensor detects unlocking of a door, the detection means that the detection result of the sensor indicates the driving-start preliminary operation.

5. The on-board storage system as claimed in claim 1,
wherein the sensor includes a door sensor and a smart key sensor, and
wherein, when the door sensor detects opening of a door and the smart key sensor detects that a smart key is present outside the vehicle, the detection means that the detection result of the sensor indicates the driving-start preliminary operation.

6. The on-board storage system as claimed in claim 1,
wherein the sensor includes a door sensor and a smart key sensor, and
wherein, when the door sensor detects closing of a door and the smart key sensor detects that a smart key is present inside the vehicle, the detection means that the detection result of the sensor indicates the driving-start preliminary operation.

7. The on-board storage system as claimed in claim 1,
wherein the sensor is a seatbelt sensor, and
wherein, when the seatbelt sensor detects wearing of a seatbelt, the detection means that the detection result of the sensor indicates the driving-start preliminary operation.

8. The on-board storage system as claimed in claim 1,
wherein the sensor is a brake sensor, and
wherein, when the brake sensor detects that a brake pedal is pressed in a state where an engine is not running, the detection means that the detection result of the sensor indicates the driving-start preliminary operation.

9. A storage device initialization method in an on-board storage system,
wherein the on-board storage system comprises:
a storage device that has a controller, a NAND flash memory, and an interface;
an electronic control unit that electronically controls a vehicle; and
a sensor,
wherein the electronic control unit communicates with the storage device through the interface,
wherein the sensor transmits a detection result of the sensor to the electronic control unit,
wherein the electronic control unit has a first interface for a main bus and a second interface for a sideband bus,
wherein the interface of the storage device includes a third interface for the main bus and a fourth interface for the sideband bus,
wherein the first interface for the main bus of the electronic control unit and the third interface for the main bus of the storage device are connected through the main bus,
wherein the second interface for the sideband bus of the electronic control unit and the fourth interface for the sideband bus of the storage device are connected through the sideband bus,
wherein the sideband bus is configured to communicate data bidirectionally between the electronic control unit and the storage device,
wherein the method comprising the step of, when a transmitted detection result of the sensor indicates a driving-start preliminary operation:
initializing, by the electronic control unit, the second interface for the sideband bus of the electronic control unit, the sideband bus, and the fourth interface for the sideband bus of the storage device; and
transmitting a command to start initialization of the NAND flash memory from the electronic control unit to the controller through the initialized sideband bus,
wherein the sideband bus is initialized separately from the main bus by the electronic control unit,
wherein the main bus is a PCIe bus and the sideband bus is an SD bus, and
wherein, the NAND flash memory is initialized through the SD bus.

10. The storage device initialization method as claimed in claim 9,
wherein the sensor is a smart key sensor, and
wherein the detection result of the sensor indicating the driving-start preliminary operation is the detection result of the smart key sensor.

11. The storage device initialization method according to claim 9,
wherein the sensor is a smart key sensor, and
wherein, when the smart key sensor detects that a smart key comes within a predetermined distance, the detection means that the detection result of the sensor indicates the driving-start preliminary operation.

12. The storage device initialization method as claimed in claim 9,
wherein the sensor is a door sensor, and
wherein, when the door sensor detects unlocking of a door, the detection means that the detection result of the sensor indicates the driving-start preliminary operation.

13. The storage device initialization method as claimed in claim 9,
wherein the sensor includes a door sensor and a smart key sensor, and
wherein, when the door sensor detects opening of a door and the smart key sensor detects that a smart key is present outside the vehicle, the detection means that the detection result of the sensor indicates the driving-start preliminary operation.

14. The storage device initialization method as claimed in claim 9,
wherein the sensor includes a door sensor and a smart key sensor, and
wherein, when the door sensor detects closing of a door and the smart key sensor detects that a smart key is present inside the vehicle, the detection means that the detection result of the sensor indicates the driving-start preliminary operation.

15. The storage device initialization method as claimed in claim 9,
wherein the sensor is a seatbelt sensor, and
wherein, when the seatbelt sensor detects wearing of a seatbelt, the detection means that the detection result of the sensor indicates the driving-start preliminary operation.

16. The storage device initialization method as claimed in claim 9,
wherein the sensor is a brake sensor, and
wherein, when the brake sensor detects that a brake pedal is pressed in a state where an engine is not running, the detection means that the detection result of the sensor indicates a driving-start preliminary operation.

* * * * *